(12) United States Patent
Lee

(10) Patent No.: US 11,343,507 B2
(45) Date of Patent: *May 24, 2022

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,537

(22) Filed: Dec. 18, 2020

(65) Prior Publication Data

US 2021/0105484 A1 Apr. 8, 2021

Related U.S. Application Data

(63) Continuation of application No. 17/015,468, filed on Sep. 9, 2020, now Pat. No. 11,146,791, which is a
(Continued)

(30) Foreign Application Priority Data

Dec. 22, 2016 (KR) .......................... 10-2016-0176441

(51) Int. Cl.
*H04N 19/00* (2014.01)
*H04N 19/137* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11); *H04N 19/30* (2014.11)

(58) Field of Classification Search
CPC .................................................. H04N 19/00
See application file for complete search history.

(56) References Cited

U.S. PATENT DOCUMENTS 9,800,857 B2 * 10/2017 Zhang ................... H04N 19/80
2007/0146485 A1 * 6/2007 Horikoshi ............ G09G 3/2092
348/173

(Continued)

FOREIGN PATENT DOCUMENTS

EP 2757784 A2 7/2014
KR 10-2012-0096471 A 8/2012
(Continued)

OTHER PUBLICATIONS

Intellectual Property India, Examination Report of corresponding Indian Patent Application No. 201917027714, dated May 12, 2021.

*Primary Examiner* — Maryam A Nasri
(74) *Attorney, Agent, or Firm* — IP Legal Services, LLC

(57) ABSTRACT

A method for decoding a video according to the present invention may comprise: determining a motion vector precision of a current block, generating a motion vector candidate list of the current block, obtaining a motion vector prediction value of the current block from the motion vector candidate list, determining whether a precision of the motion vector prediction value is identical to a motion vector precision of the current block, scaling the motion vector prediction value according to the motion vector precision of the current block, when the precision of the motion vector prediction value is different from the motion vector precision of the current block, and obtaining a motion vector of the current block using the scaled motion vector prediction value.

10 Claims, 8 Drawing Sheets

Related U.S. Application Data continuation of application No. 16/472,849, filed as application No. PCT/KR2017/014869 on Dec. 15, 2017, now Pat. No. 10,805,608.

(51) Int. Cl.
*H04N 19/105* (2014.01)
*H04N 19/159* (2014.01)
*H04N 19/176* (2014.01)
*H04N 19/30* (2014.01)

(56) References Cited

U.S. PATENT DOCUMENTS

| | | | |
|---|---|---|---|
| 2012/0263235 A1* | 10/2012 | Sugio | H04N 19/577 375/240.16 |
| 2013/0016788 A1 | 1/2013 | Oh | |
| 2013/0022119 A1* | 1/2013 | Chien | H04N 19/176 375/240.16 |
| 2013/0101040 A1 | 4/2013 | Francois et al. | |
| 2013/0170553 A1* | 7/2013 | Chen | H04N 19/50 375/240.16 |
| 2013/0265388 A1 | 10/2013 | Zhang et al. | |
| 2013/0329007 A1 | 12/2013 | Zhang et al. | |
| 2014/0044180 A1* | 2/2014 | Chen | H04N 19/51 375/240.16 |
| 2014/0140400 A1* | 5/2014 | George | H04N 19/70 375/240.12 |
| 2014/0177707 A1* | 6/2014 | George | H04N 19/70 375/240.03 |
| 2014/0192868 A1* | 7/2014 | Chen | H04N 19/33 375/240.12 |
| 2014/0253681 A1* | 9/2014 | Zhang | H04N 19/513 348/43 |
| 2014/0301466 A1* | 10/2014 | Li | H04N 19/105 375/240.16 |
| 2014/0348241 A1 | 11/2014 | Lim et al. | |
| 2015/0010051 A1* | 1/2015 | Chen | H04N 19/105 375/240.02 |
| 2015/0146103 A1 | 5/2015 | Koo et al. | |
| 2015/0195525 A1 | 7/2015 | Sullivan et al. | |
| 2015/0195557 A1 | 7/2015 | Silkin et al. | |
| 2015/0271515 A1* | 9/2015 | Pang | H04N 19/70 375/240.16 |
| 2015/0334414 A1 | 11/2015 | Oh | |
| 2016/0057420 A1* | 2/2016 | Pang | H04N 19/523 375/240.16 |
| 2016/0100189 A1* | 4/2016 | Pang | H04N 19/593 375/240.13 |
| 2016/0191941 A1 | 6/2016 | Oh | |
| 2016/0191942 A1 | 6/2016 | Oh | |
| 2016/0191943 A1 | 6/2016 | Oh | |
| 2016/0191944 A1 | 6/2016 | Oh | |
| 2016/0337662 A1* | 11/2016 | Pang | H04N 19/176 |
| 2016/0360229 A1 | 12/2016 | Lim et al. | |
| 2016/0366436 A1 | 12/2016 | Lim et al. | |
| 2016/0381376 A1 | 12/2016 | Oh et al. | |
| 2016/0381377 A1 | 12/2016 | Oh et al. | |
| 2016/0381378 A1 | 12/2016 | Oh et al. | |
| 2016/0381379 A1 | 12/2016 | Oh et al. | |
| 2016/0381380 A1 | 12/2016 | Oh et al. | |
| 2016/0381381 A1 | 12/2016 | Oh et al. | |
| 2016/0381382 A1 | 12/2016 | Oh et al. | |
| 2016/0381383 A1 | 12/2016 | Oh et al. | |
| 2017/0127082 A1* | 5/2017 | Chen | H04N 19/176 |
| 2017/0332075 A1* | 11/2017 | Karczewicz | H04N 19/107 |
| 2017/0339426 A1 | 11/2017 | Lee et al. | |
| 2017/0359587 A1 | 12/2017 | Sullivan et al. | |
| 2018/0098087 A1* | 4/2018 | Li | H04N 19/159 |
| 2018/0098089 A1* | 4/2018 | Chen | H04N 19/521 |
| 2018/0131947 A1 | 5/2018 | Sullivan et al. | |
| 2018/0146208 A1* | 5/2018 | Hojati | H04N 19/52 |
| 2018/0176596 A1* | 6/2018 | Jeong | H04N 19/523 |
| 2019/0110066 A1 | 4/2019 | Lim et al. | |
| 2019/0110067 A1 | 4/2019 | Lim et al. | |
| 2019/0110068 A1 | 4/2019 | Lim et al. | |
| 2020/0344490 A1 | 10/2020 | Lim et al. | |

FOREIGN PATENT DOCUMENTS

| | | |
|---|---|---|
| KR | 10-2016-0106703 A | 9/2016 |
| WO | 2012/081879 A1 | 6/2012 |
| WO | 2013/162273 A1 | 10/2013 |
| WO | 2016/068674 A1 | 5/2016 |

* cited by examiner

METHOD AND APPARATUS FOR PROCESSING VIDEO SIGNAL

CROSS REFERENCE TO RELATED APPLICATIONS

This application is a Continuation of U.S. patent application Ser. No. 17/015,648 (filed on Sep. 9, 2020), which is a Continuation of U.S. patent application Ser. No. 16/472,849 (filed on Jun. 21, 2019), now issued as U.S. Pat. No. 10,805,608, which is a National Stage Patent Application of PCT International Patent Application No. PCT/KR2017/014869 (filed on Dec. 15, 2017) under 35 U.S.C. § 371, which claims priority to Korean Patent Application No. 10-2016-0176441 (filed on Dec. 22, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently performing inter prediction for an encoding/decoding target block in encoding/decoding a video signal.

An object of the present invention is to provide a method and an apparatus for variably determining a motion vector precision in encoding/decoding a video signal.

An object of the present invention is to provide a method and an apparatus for compensating a difference between motion vector precisions of blocks by comparing the motion vector precisions of the blocks.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may determine a motion vector precision of a current block, generate a motion vector candidate list of the current block, obtain a motion vector prediction value of the current block from the motion vector candidate list, determine whether a precision of the motion vector prediction value is identical to a motion vector precision of the current block, scale the motion vector prediction value according to the motion vector precision of the current block when the precision of the motion vector prediction value is different from the motion vector precision of the current block, and obtain a motion vector of the current block using the scaled motion vector prediction value.

A method and an apparatus for encoding a video signal according to the present invention may determine a motion vector precision of a current block, generate a motion vector candidate list of the current block, obtain a motion vector prediction value of the current block from the motion vector candidate list, determine whether a precision of the motion vector prediction value is identical to a motion vector precision of the current block, scale the motion vector prediction value according to the motion vector precision of the current block when the precision of the motion vector prediction value is different from the motion vector precision of the current block, and obtain a motion vector of the current block using the scaled motion vector prediction value.

In the method and the apparatus for encoding/decoding a video signal according to the present invention, the motion vector precision of the current block is determined from a motion vector precision set comprising a plurality of motion vector precision candidates.

In the method and the apparatus for encoding/decoding a video signal according to the present invention, the motion vector precision of the current block is determined based on index information specifying one among the plurality of motion vector precision candidates.

In the method and the apparatus for encoding/decoding a video signal according to the present invention, a motion vector difference value comprises a prefix part representing an integer part and a suffix part representing a fractional part.

In the method and the apparatus for encoding/decoding a video signal according to the present invention, the scaling is performed by a bit shift operation based on a scale ratio between the precision of the motion vector prediction value and the motion vector precision of the current block.

The features briefly summarized above for the present invention are only illustrative aspects of the detailed description of the invention that follows, but do not limit the scope of the invention.

Advantageous Effects

According to the present invention, an efficient inter prediction may be performed for an encoding/decoding target block.

According to the present invention, it is possible to determine a motion vector precision variably.

According to the present invention, a motion vector can be derived by compensating a difference between motion vector resolutions of blocks.

The effects obtainable by the present invention are not limited to the above-mentioned effects, and other effects not mentioned can be clearly understood by those skilled in the art from the description below.

MODE FOR INVENTION

Figure 1:
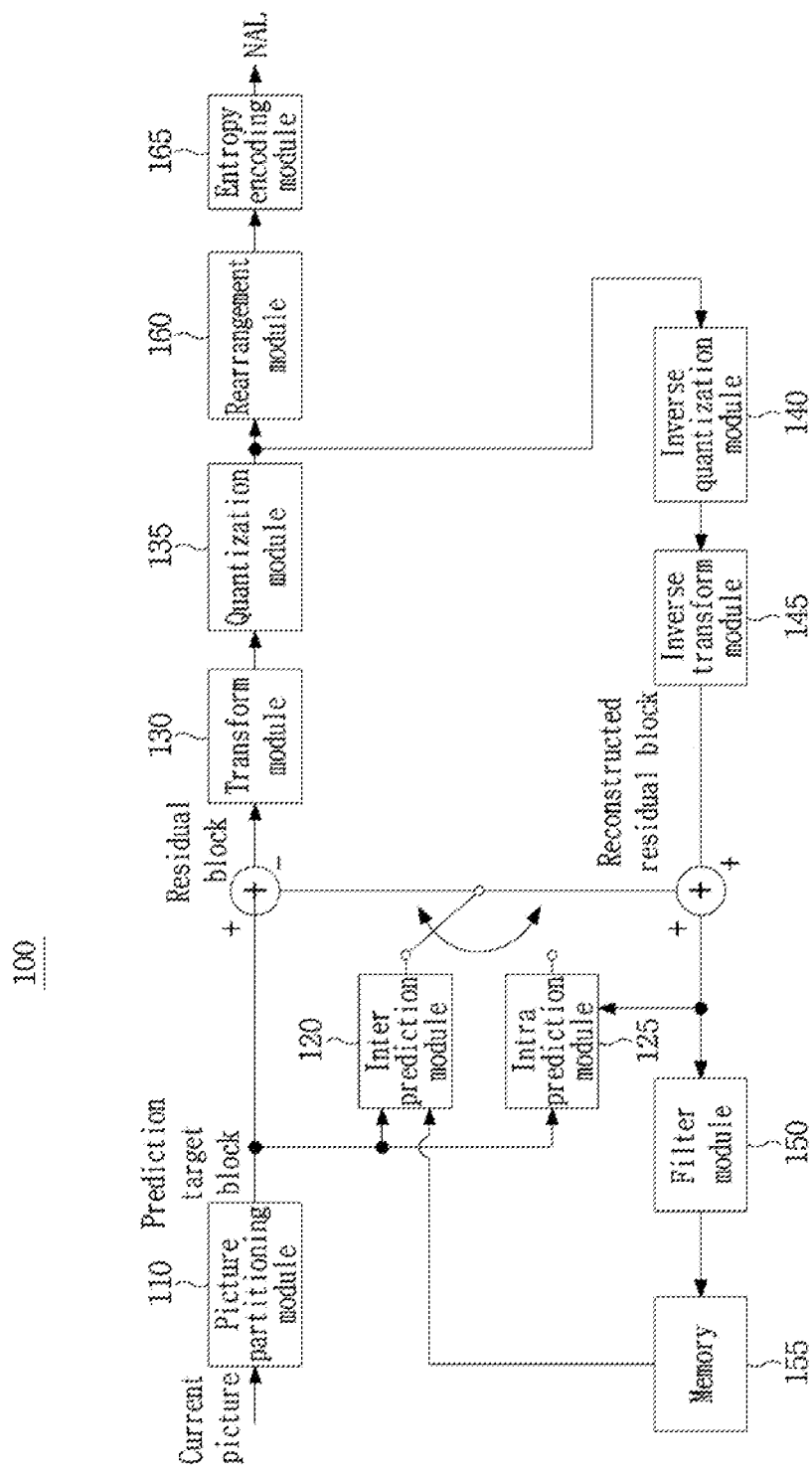
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in a unit of a ¼ pixel. In the case of chroma signals, a 4-tap DCT-based interpolation filter having different filter coefficient may be used to generate pixel information of an integer pixel or less than an integer pixel in a unit of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in a unit of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in a unit of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
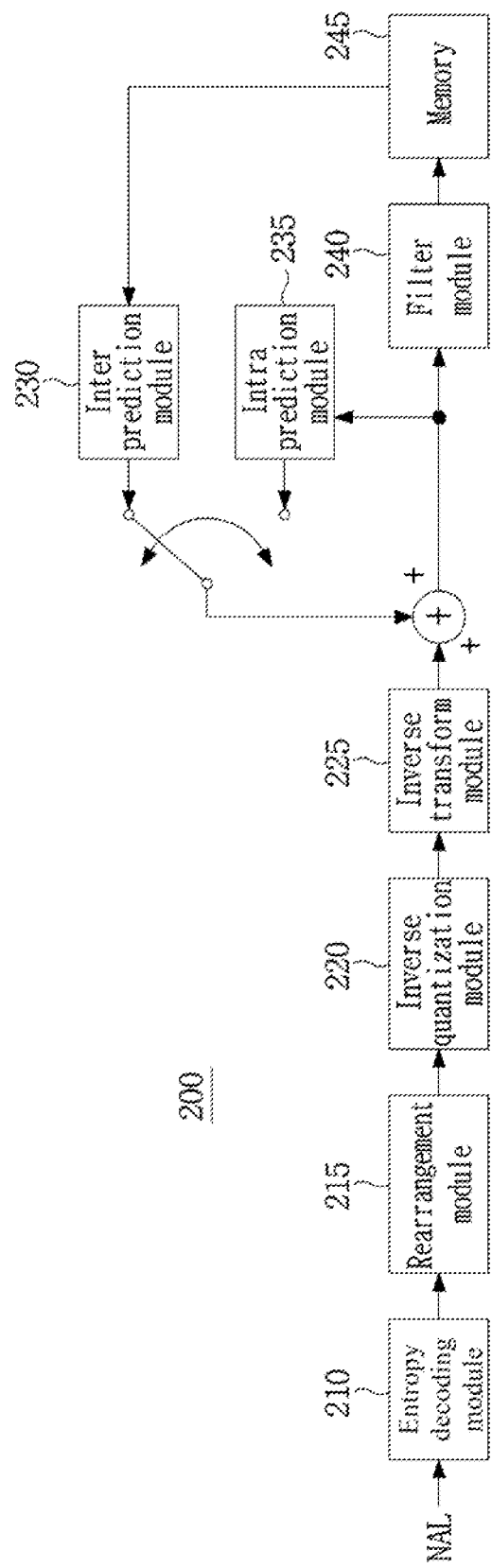
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
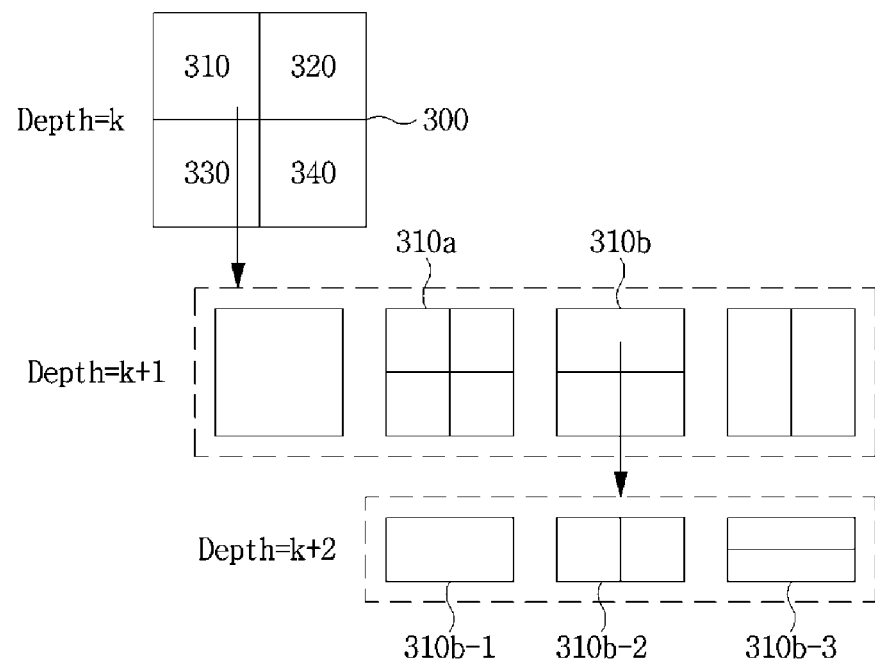
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in a unit of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5A:
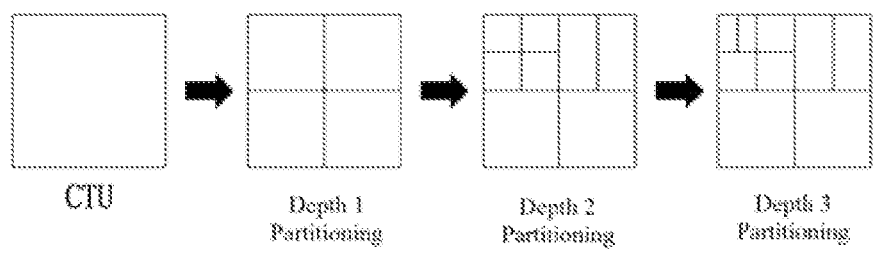
FIGS. 5A and 5B are diagrams illustrating an example in which only a binary tree-based partition of a predetermined type is allowed according to an embodiment of the present invention.
Figure 5B:
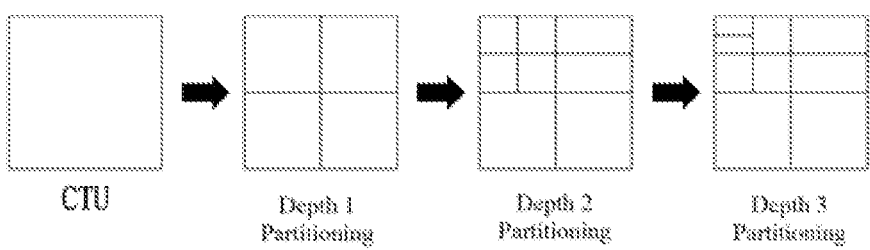

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in a unit of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Figure 6:
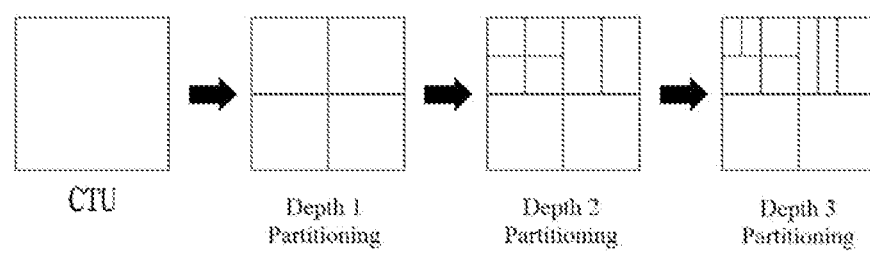
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in a unit of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
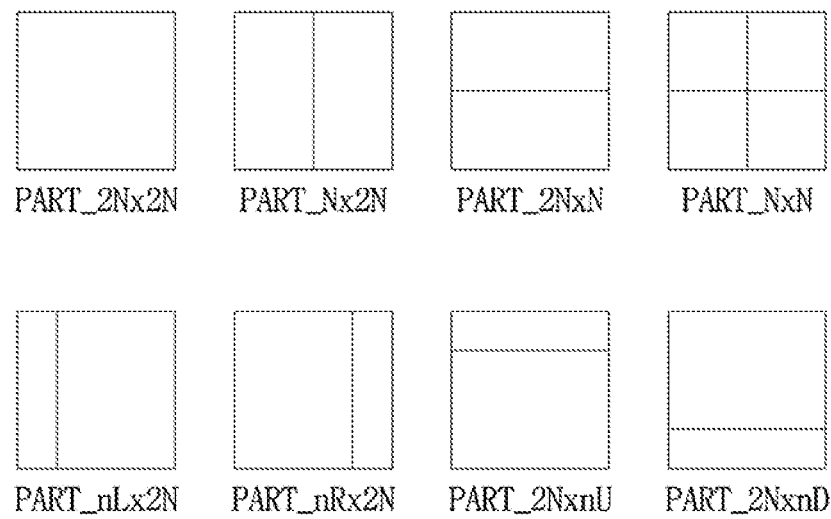
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
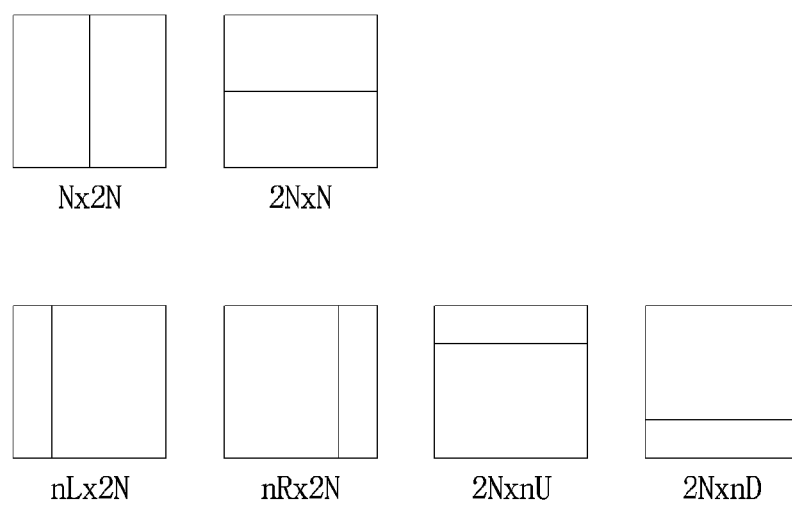
FIG. 4 is a diagram illustrating a partition type in which binary tree-based partitioning is allowed according to an embodiment of the present invention.

When a coding block is encoded by inter prediction, one of 8 partitioning modes may be applied to the coding block, as in the example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
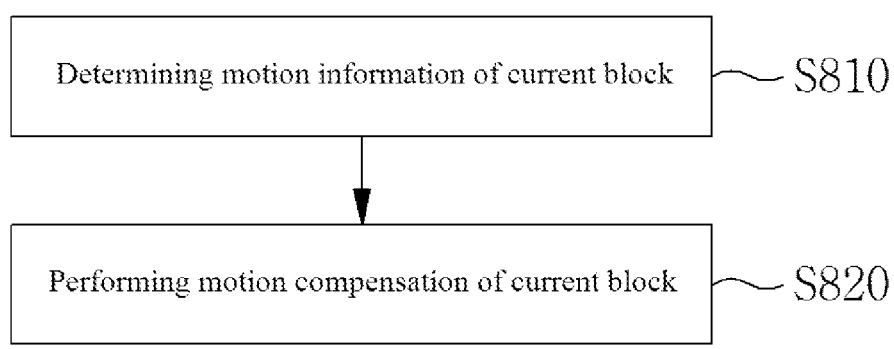
FIG. 8 is a flowchart illustrating an inter prediction method according to an embodiment of the present invention.

FIG. 8 is a flowchart illustrating an inter prediction method according to an embodiment of the present invention.

Referring to FIG. 8, motion information of a current block is determined S810. The motion information of the current block may include at least one of a motion vector relating to the current block, a reference picture index of the current block, or an inter prediction direction of the current block.

The motion information of the current block may be obtained based on at least one of information signaled through a bitstream or motion information of a neighboring block adjacent to the current block.

Figure 9:
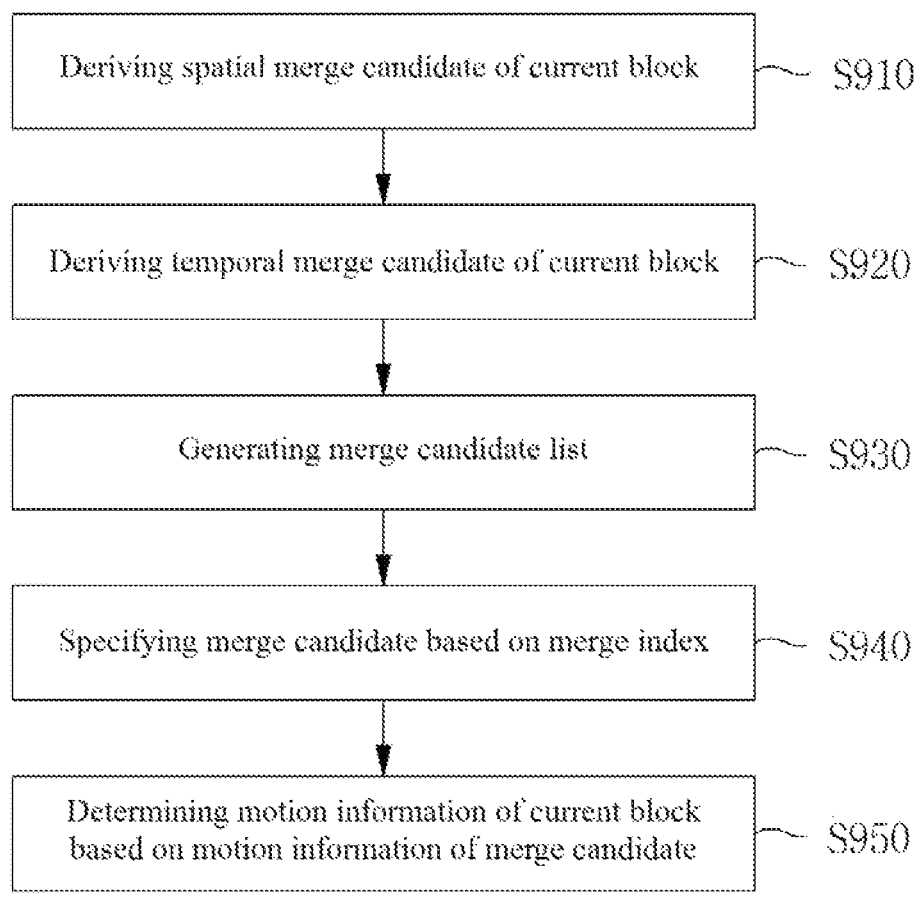
FIG. 9 is a diagram illustrating a process of deriving motion information of a current block when a merge mode is applied to a current block.

FIG. 9 is a diagram illustrating a process of deriving motion information of a current block when a merge mode is applied to a current block.

If the merge mode is applied to the current block, a spatial merge candidate may be derived from a spatial neighboring block of the current block S910. The spatial neighboring block may include at least one of blocks adjacent to a top, a left, or a corner (e.g., at least one of a top left corner, a top right corner, or a bottom left corner) of the current block.

Motion information of a spatial merge candidate may be set to be the same as the motion information of the spatial neighboring block.

A temporal merge candidate may be derived from a temporal neighboring block of the current block S920. The temporal neighboring block may mean a co-located block included in a collocated picture. The collocated picture has a picture order count (POC) different from a current picture including the current block. The collocated picture may be determined to a picture having a predefined index in a reference picture list or may be determined by an index signaled from a bitstream. The temporal neighboring block may be determined to a block having the same position and size as the current block in the collocated picture or a block adjacent to the block having the same position and size as the current block. For example, at least one of a block including center coordinates of the block having the same position and size as the current block in the collocated picture or a block adjacent to a bottom right boundary of the block may be determined as the temporal neighboring block.

Motion information of the temporal merge candidate may be determined based on motion information of the temporal neighboring block. For example, a motion vector of the temporal merge candidate may be determined based on a motion vector of the temporal neighboring block. In addition, an inter prediction direction of the temporal merge candidate may be set to be the same as an inter prediction direction of the temporal neighboring block. However, a reference picture index of the temporal merge candidate may have a fixed value. For example, the reference picture index of the temporal merge candidate may be set to '0'.

Thereafter, the merge candidate list including the spatial merge candidate and the temporal merge candidate may be generated S930. If the number of merge candidates included in the merge candidate list is smaller than the maximum number of merge candidates, a combined merge candidate combining two or more merge candidates or a merge candidate have zero motion vector (0, 0) may be included in the merge candidate list.

When the merge candidate list is generated, at least one of merge candidates included in the merge candidate list may be specified based on a merge candidate index S940.

Motion information of the current block may be set to be the same as motion information of the merge candidate specified by the merge candidate index S950. For example, when the spatial merge candidate is selected by the merge candidate index, the motion information of the current block may be set to be the same as the motion information of the spatial neighboring block. Alternatively, when the temporal merge candidate is selected by the merge candidate index, the motion information of the current block may be set to be the same as the motion information of the temporal neighboring block.

Figure 10:
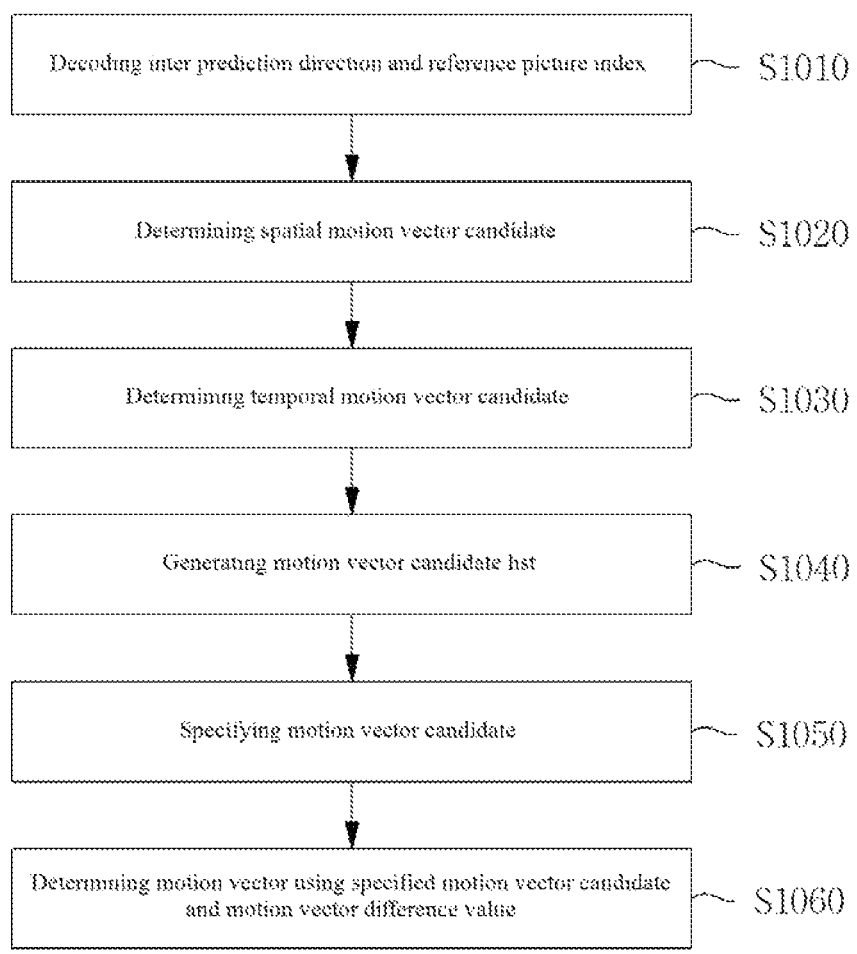
FIG. 10 illustrates a process of deriving motion information of a current block when an AMVP mode is applied to the current block.

FIG. 10 illustrates a process of deriving motion information of a current block when an AMVP mode is applied to the current block.

When the AMVP mode is applied to the current block, at least one of an inter prediction direction or a reference picture index of the current block may be decoded from a bitstream S1010. That is, when the AMVP mode is applied, at least one of the inter prediction direction or the reference picture index of the current block may be determined based on the encoded information through the bitstream.

A spatial motion vector candidate may be determined based on a motion vector of a spatial neighboring block of the current block S1020. The spatial motion vector candidate may include at least one of a first spatial motion vector candidate derived from a top neighboring block of the current block and a second spatial motion vector candidate derived from a left neighboring block of the current block. Here, the top neighboring block may include at least one of blocks adjacent to a top or a top right corner of the current block, and the left neighboring block of the current block may include at least one of blocks adjacent to a left or a bottom left corner of the current block. A block adjacent to a top left corner of the current block may be treated as the top neighboring block, or the left neighboring block.

When reference pictures between the current block and the spatial neighboring block are different, a spatial motion vector may be obtained by scaling the motion vector of the spatial neighboring block.

A temporal motion vector candidate may be determined based on a motion vector of a temporal neighboring block of the current block S1030. If reference pictures between the current block and the temporal neighboring block are different, a temporal motion vector may be obtained by scaling the motion vector of the temporal neighboring block.

A motion vector candidate list including the spatial motion vector candidate and the temporal motion vector candidate may be generated S1040.

When the motion vector candidate list is generated, at least one of the motion vector candidates included in the motion vector candidate list may be specified based on information specifying at least one of the motion vector candidate list S1050.

The motion vector candidate specified by the information is set as a motion vector prediction value of the current block. And, a motion vector of the current block is obtained by adding a motion vector difference value to the motion vector prediction value 1060. At this time, the motion vector difference value may be parsed from the bitstream.

When the motion information of the current block is obtained, motion compensation for the current block may be performed based on the obtained motion information S820. More specifically, the motion compensation for the current block may be performed based on the inter prediction direction, the reference picture index, and the motion vector of the current block.

As in the above example, motion compensation for the current block may be performed based on motion information of the current block. In this case, a motion vector may have a precision (or resolution) of an integer pixel unit or a decimal pixel unit.

The integer pixel unit may include N integer-pel, such as an integer-pel, 2 integer-pel, 4 integer-pel, or the like. Here, N may be represented by a natural number of 1 or more, in particular, by an exponent of 2. The integer-pel may represent one pixel precision (i.e., one pixel unit), the 2 integer-pel may represent twice of one pixel precision (i.e., two pixel units), and the 4 integer-pel may represent four times of one pixel precision (i.e., four pixel units). According to the selected integer-pel, a motion vector may be expressed in a unit of N-pixel, and a motion compensation may be performed in a unit of N-pixel.

The decimal pixel unit may include 1/N pel such as a half-pel, a quarter-pel, an octo-pel, or the like. Here, N may be represented by a natural number of 1 or more, in particular, by an exponent of 2. The half-pel may represent ½ precision of one pixel (i.e., a half pixel unit), the quarter-pel may represent ¼ precision of one pixel (i.e., a quarter pixel unit), and the octo-pel may represent ⅛ precision of one pixel (i.e., an octo pixel unit). According to the selected decimal pel, the motion vector may be expressed in a unit of 1/N pixel, and a motion compensation may be performed in a unit of 1/N pixel.

Figure 11:
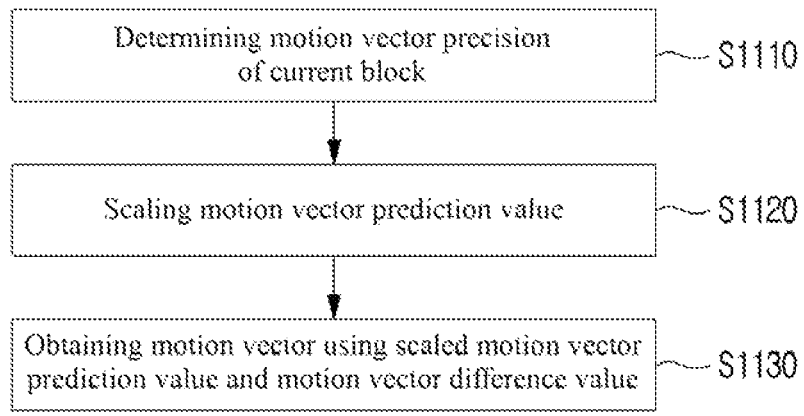
FIGS. 11 and 12 illustrate mothing vector derivation methods according to a motion vector precision of a current block.
Figure 12:
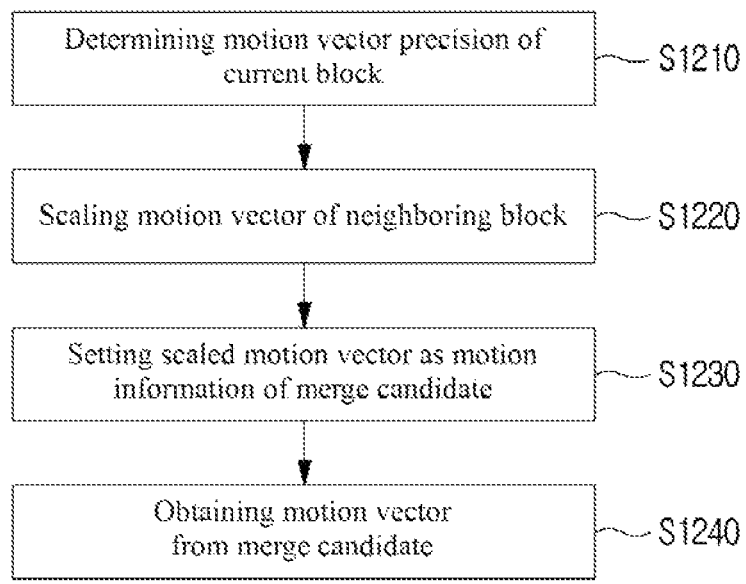

FIGS. 11 and 12 are diagrams illustrating a motion vector derivation method according to a motion vector precision of a current block. FIG. 11 shows a motion vector derivation method under an AMVP mode, and FIG. 12 shows a motion vector derivation method under a merge mode.

First, a motion vector precision of the current block may be determined S1110, S1210.

A precision of a motion vector may be determined in a unit of a sequence, a picture, a slice, or a predetermined block. Here, the predetermined block may represent CTU, CU, PU, or a block of a predetermined size/shape. The CTU may mean CU of maximum size which is allowed in the encoder/decoder. If a motion vector precision is determined at a level higher than a block such as a sequence, a picture, or a slice, a motion compensation for the predetermined block may be performed according to the motion vector precision determined at the higher level. For example, a motion compensation for blocks included in a first slice may be performed using a motion vector in which a precision is an integer-pel unit, while a motion compensation for blocks included in a second slice may be performed using a motion vector in which a precision is a quarter-pel unit.

To determine a precision of a motion vector, information for determining the precision of the motion vector may be signaled through the bitstream. The information may be index information, 'mv_resolution_idx', specifying at least one of a plurality of motion vector precisions. For example, Table 1 shows motion vector precisions according to mv_resolution_idx.

TABLE 1

| mv_resolution_idx | Motion vector pixel unit |
| --- | --- |
| 0 | Quarter pel pixel unit |
| 1 | Half pel pixel unit |
| 2 | Integer pel pixel unit |
| 3 | Octo pel pixel unit |
| 4 | 2 integer pel pixel unit |
| 5 | 4 integer pel pixel unit |

The example shown in Table 1 is merely an example to which the present invention can be applied. Types and/or the numbers of motion vector precision candidates that can be applied to a predetermined unit may be different from those shown in Table 1. A value and/or a range of mv_resolution_idx may also differ depending on the type and/or the number of the motion vector precision candidates.

In another example, a motion vector precision may be derived from a unit which is spatially or temporally adjacent to a predetermined unit. Here, the predetermined unit may represent a picture, a slice, or a block, and a neighboring unit may represent a picture, a slice, or a block which is spatially or temporally adjacent to the predetermined unit. For example, a motion vector precision of a current block may be set equal to a motion vector precision of a block specified by index information among a spatial neighboring block and/or a temporal neighboring block.

As another example, a motion vector precision of a current block may be determined adaptively according to motion information of the current block. For example, a motion vector precision of a current block may be adaptively determined according to whether a temporal order or a picture order count of a reference picture of the current block precedes a current picture, whether a temporal order or a picture order count of a reference picture of the current block is later than a current picture, or whether a reference picture of the current block is a current picture.

Some of a plurality of motion vector precision candidates may be selectively used. For example, after defining a motion vector precision set that includes at least one motion vector precision candidate, it is possible to determine a motion vector precision by at least one motion vector precision candidate included in the motion vector precision set.

The motion vector precision set may be determined in a unit of a sequence, a picture, a slice, or a block. Motion vector precision candidates included in the motion vector precision set may be predefined in the encoder and the decoder. Alternatively, the motion vector precision set may be determined based on encoding information signaled through the bitstream. Here, the encoding information may be related to at least one of types and/or the number of motion vector precision candidates included in the motion vector resolution set. As another example, the motion vector precision set may be derived from a unit spatially or temporally adjacent to a predetermined unit. Here, the predetermined unit may represent a picture, a slice, or a block, and a neighboring unit may represent a picture, a slice, or a block spatially or temporally adjacent to the predetermined unit. For example, a motion vector precision set of a predetermined slice may be set equal to a motion vector precision set of a slice spatially adjacent to the slice. Alternatively, depending on a dependency between slices, a motion vector precision set of an independent slice may be set to a motion vector precision set of a dependent slice.

If the motion vector precision set is determined, at least one motion vector precision candidate included in the motion vector precision set may be determined as a motion vector precision. To this end, index information specifying at least one of motion vector precision candidates included in the motion vector precision set may be signaled through the bitstream. For example, a motion vector precision of a current block may be set as a candidate specified by the index information among motion vector precision candidates included in the motion vector precision set.

Whether or not to use the motion vector precision set may be determined adaptively according to a slice type, a size/shape of the current block, or motion information of the current block (e.g., a reference picture of the current block or a prediction direction of the current block). Alternatively, information (e.g., a flag) indicating whether the motion vector precision set is used may be signaled through the bitstream.

If the motion vector precision set is determined at a level higher than a block such as a sequence, a picture, or a slice, a motion vector precision of a predetermined block may be derived from the motion vector precision set determined at the higher level. For example, if a motion vector precision set including a quarter-pel and 2 integer-pel is defined at a picture level, a block included in the picture may be limitedly use at least one of the quarter-pel or the 2 integer-pel.

When a multi-directional prediction is applied to a current block, a plurality of motion vectors according to the multi-directional prediction may have different motion vector precision from each other. That is, a precision of any one of motion vectors of the current block may be different from a precision of another motion vector. For example, when bi-prediction is applied to the current block, a precision of forward motion vector mvL0 may be different from a precision of backward motion vector mvL1. Even when multi-directional prediction having more than three direction is applied to the current block, at least one of the plurality of motion vectors may have a different precision from another. Accordingly, information for determining a motion vector precision may be encoded/decoded for each prediction direction of the current block.

If an AMVP mode is applied to the current block and if a motion vector precision of each block is determined variably, a precision of a motion vector prediction value (or Motion Vector Predictor, MVP) derived from a neighboring block may be different from a motion vector precision of the current block. In order to adjust the precision of the motion vector prediction value to the motion vector precision of the current block, the motion vector prediction value may be scaled according to the motion vector precision of the current block S1120. The motion vector prediction value may be scaled according to the motion vector precision of the current block. A motion vector of the current block may be derived by adding a motion vector difference (MVD) to the scaled motion vector prediction value S1130.

For example, if a pixel unit of a motion vector of the neighboring block is a quarter pel and a pixel unit of a motion vector the current block is an integer pel, the motion vector prediction value derived from the neighboring block may be scaled in a unit of an integer pel, and a motion vector having a precision of an integer pel may be derived by adding the scaled motion vector prediction value and the motion vector difference value. For example, the following Equation 1 shows an example in which a motion vector is obtained by scaling the motion vector prediction value in a unit of an integer pel.

$$mvLX[0]=((mvpLX[0]»2)+mvdLX[0])«2$$

$$mvLX[1]=((mvpLX[1]»2)+mvdLX[1])«2 \quad \text{[Equation 1]}$$

In the Equation 1, mvpLX denotes a motion vector prediction value, and mvdLX denotes a motion vector difference value. In addition, mvLX[0], mvpLX[0] and mvdLX[0] represent motion vector components of a vertical direction, and mvLX[1], mvpLX[1] and mvdLX[1] represent motion vector components of a horizontal direction.

As another example, when a pixel unit of a motion vector of a neighboring block is 2 integer-pel and a pixel unit of a motion vector of the current block is a quarter pel, a motion vector prediction value derived from the neighboring block may be scaled in a unit of a quarter pel, and a motion vector having a precision of a quarter pel may be derived by adding the scaled motion vector prediction value and the motion vector difference value. For example, the following Equation 2 shows an example in which a motion vector is obtained when a current picture is used as a reference picture.

$$mvLX[0]=((mvpLX[0]»3)+mvdLX[0])«3$$

$$mvLX[1]=((mvpLX[1]»3)+mvdLX[1])«3 \quad \text{[Equation 2]}$$

In Equations 1 and 2, a bit shift value used for scaling the motion vector prediction value may be adaptively determined according to a scale ratio between a motion vector precision of the current block and a motion vector precision of the neighboring block.

Unlike the example shown in FIG. 11, it is also possible to scale a motion vector generated by adding a motion vector prediction value and a motion vector difference value according to a motion vector precision of the current block.

A motion vector difference value may be encoded/decoded according to a motion vector precision of the current block. For example, when a motion vector precision of the current block is a quarter pel, a motion vector difference value for the current block may be encoded/decoded in a unit of a quarter pel.

It is also possible to encode/decode a motion vector difference value in a predetermined unit regardless of a motion vector precision of the current block. Here, the predetermined unit may be a fixed pixel unit (e.g., an integer pel or a quarter pel) predefined in the encoder and the decoder, or may be a pixel unit determined at a higher level such as a picture or a slice. When a motion vector precision of the current block is different from a precision of the motion vector difference value, a motion vector of the current block may be derived by scaling the motion vector difference value or scaling a motion vector derived by adding the scaled motion vector prediction value and the motion vector difference value. For example, when the motion vector precision of the current block is an integer pel while the motion vector difference value is coded with a precision of a quarter pel, as shown in Equation 1, a motion vector of the current block may be derived by scaling a motion vector derived by adding the scaled motion vector prediction value and the motion vector difference value.

Depending on a motion vector precision, an encoding/decoding method of the motion vector difference value may be determined differently. For example, if a resolution is in a unit of a decimal pixel, a motion vector difference value may be encoded/decoded by dividing it into a prefix part and a suffix part. The prefix part may represent an integer part of a motion vector, and the suffix part may represent a fractional part of a motion vector. For example, the following Equation 3 shows an example of deriving the prefix part 'predfix_mvd' and the suffix part 'suffix_mvd'.

$$\text{prefix\_mvd} = MVD/N$$

$$\text{suffix\_mvd} = MVD \% N \qquad \text{[Equation 3]}$$

In Equation 3, N may be a fixed value or may be a value that is variably determined according to a motion vector precision of the current block. For example, N may be proportional to the motion vector precision of the current block.

If a motion vector precision of the current block is an integer pel pixel unit of two or more times, a value obtained by shifting a motion vector difference value by N may be encoded. For example, if a motion vector precision of the current block is 2 integer-pel, it is possible to encode/decode a half of a motion vector difference value. If a motion vector precision of the current block is 4 integer-pel, it is possible to encode/decode a quarter of a motion vector difference value. In this case, a motion vector of the current block may be derived by scaling a decoded motion vector difference value in accordance with the motion vector precision of the current block.

If a merge mode or a skip mode is applied to the current block and a motion vector precision of each block is determined variably, it may occur that a motion vector precision of the current block is different from that of a spatial/temporal merge candidate block. Accordingly, a motion vector of the spatial/temporal neighboring block is scaled according to the motion vector precision of the current block S1220, and a scaled motion vector may be set as motion information of the spatial/temporal merging candidate S1230. For example, motion vectors mvLX[0] and/or mvLX[1] of the spatial/temporal neighboring block are scaled according to the motion vector precision of the current block to derive the scaled motion vectors mxLXscale[0] and/or mvLXscale[1], and the scaled motion vectors may be set as motion vectors of the spatial/temporal merge candidate.

For example, when a motion vector precision of a neighboring block adjacent to the current block is a quarter pel and a motion vector precision of the current block is an integer pel, a motion vector of the neighboring block may be scaled as shown in Equation 4, and a scaled motion vector may be set as a motion vector of a spatial merge candidate.

$$mvLX\text{scale}[0] = (mvLX[0] \gg 2) \ll 2$$

$$mvLX\text{scale}[1] = (mvLX[1] \gg 2) \ll 2 \qquad \text{[Equation 4]}$$

In Equation 4, a bit shift value used for scaling a motion vector of a neighboring block may be adaptively determined according to a scale ratio between the motion vector precision of the current block and the motion vector precision of the neighboring block.

As another example, after selecting a merge candidate to be merged with the current block (i.e., a merge candidate selected by merge index), it may be check whether a motion vector precision of it is corresponding to a motion vector precision of the current block. If the motion vector precision of the selected merge candidate does not identical to the motion vector precision of the current block, a motion vector of the selected merge candidate may be scaled according to the motion vector precision of the current block.

A motion vector of the current block may be set equal to a motion vector (i.e., the scaled motion vector) of the merge candidate selected by index information among merge candidates S1240.

Unlike the example shown in FIG. 12, a merge candidate for the current block may be determined in consideration of a motion vector precision of a spatial/temporal neighboring block. For example, based on a result of whether a difference or a scale ratio between a motion vector precision of a spatial neighboring block and a motion vector precision of the current block is equal to or greater than a predetermined threshold value, it may be determined that whether the spatial/temporal neighboring block is available as a merge candidate. For example, if a motion vector precision of a spatial merge candidate is 2 integer-pel and a motion vector precision of the current block is a quarter-pel, it may mean that a correlation between two blocks are not significant. Accordingly, the spatial/temporal neighboring block of which a precision difference with a motion vector precision of the current block is greater than the threshold value may be set to be unavailable as a merge candidate. That is, the spatial/temporal neighboring block can be used as a merge candidate only when a difference between a motion vector precision of the spatial/temporal neighboring block and a motion vector precision of the current block is less than the threshold value. The spatial/temporal neighboring block that is not unavailable as a merge candidate may not be added to a merge candidate list.

When a difference or a scale ratio between a motion vector precision of the current block and a motion vector precision of the neighboring block is less than or equal to the threshold value but both precisions are different from each other, a scaled motion vector may be set as a motion vector of the merge candidate, or a motion vector of the merge candidate specified by a merge index may be scaled as in the embodiment described above with reference to FIG. 12.

A motion vector of the current block may be derived from a motion vector of the merge candidate added to the merge candidate list. If a motion vector precision of the current block is different from a motion vector precision of the merge candidate added to the merge candidate list, a motion vector precision difference value may represent a difference between the motion vector precisions or may represent a difference between corresponding values each of which corresponds to a motion vector precision. Here, the corresponding value may indicate an index value corresponding to a motion vector precision shown in Table 1, or may represent a value assigned to each motion vector precision shown in Table 2. For example, in Table 2, a corresponding value assigned to a quarter pel is 2, and a corresponding value assigned to an integer pel is 3, so a difference of both precisions may be determined to be 2.

TABLE 2

| Motion vector pixel unit | Corresponding value |
| --- | --- |
| Octo-pel pixel unit | 0 |
| Quarter-pel pixel unit | 1 |
| Half-pel pixel unit | 2 |
| Integer-pel pixel unit | 3 |
| 2 integer-pel pixel unit | 4 |
| 4 integer-pel pixel unit | 5 |

The availability of the temporal/spatial neighboring block may also be determined using a scale ratio of motion vector precisions instead of a motion vector precision difference value. Here, the scale ratio of motion vector precisions may represent a ratio between both motion vector precisions. For example, a scale ratio between a quarter pel and an integer pel may be defined as 4.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding a video, the method comprising:
determining a motion vector precision of a current block;
obtaining a motion vector difference value of the current block, the motion vector difference value being scaled based on the motion vector precision of the current block;
obtaining a motion vector prediction value of the current block from a motion vector predictor list;
obtaining a motion vector of the current block using the motion vector prediction value and the scaled motion vector difference value;
determining a reference picture of the current block based on a reference picture list; and
obtaining a prediction sample of the current block by using the motion vector and the reference picture,
wherein when it is determined that the motion vector precision of the current block is determined from a motion vector precision set including a plurality of motion vector precision candidates, the motion vector precision of the current block is determined based on index information specifying one of the plurality of motion vector precision candidates,
wherein when it is determined that the motion vector precision of the current block is determined without using the motion vector precision set, the motion vector precision of the current block is determined without parsing the index information, and
wherein determination of whether the motion vector precision set is used or not is based on a flag signaled for the current block.

2. The method of claim 1, wherein a number or a type of motion vector precision candidates is varied according to a value of information signaled for the current block.

3. The method of claim 2, wherein a maximum bit-length of the index information is varied depending on the value of the information.

4. The method of claim 1, wherein the motion vector precision of the current block is determined further based on whether a reference picture of the current block is a current picture or a picture having a POC (Picture Order Count) different from the current picture.

5. The method of claim 1, wherein when it is determined that the motion vector precision of the current block is determined without using the motion vector precision set, the motion vector precision of the current block is determined a pre-defined value.

6. A method of encoding a video, the method comprising:
determining a motion vector precision of a current block;
obtaining a motion vector of the current block;
determining a motion vector prediction value from a motion vector predictor list; and
deriving a motion vector difference value by subtracting the motion vector prediction value from the motion vector;
determining a reference picture of the current block based on a reference picture list;
obtaining a prediction sample of the current block based on the motion vector; and
encoding a scale motion vector difference value, the motion vector difference value being scaled based on the motion vector precision of the current block,
wherein when the motion vector precision of the current block is determined from a motion vector precision set including a plurality of motion vector precision candidates, index information specifying one of the plurality of motion vector precision candidates is encoded in a bitstream,
wherein when the motion vector precision of the current block is determined without using the motion vector precision set, encoding the index information is skipped, and
wherein a flag indicating whether the motion vector precision set is used or not is encoded in the bitstream.

7. The method of claim 6, wherein information for determining a number or a type of motion vector precision candidates is further encoded in the bitstream.

8. The method of claim 7, wherein a maximum bit-length of the index information is determined depending on a value of the information.

9. The method of claim 6, wherein the motion vector precision of the current block is determined further based on whether a reference picture of the current block is a current picture or a picture having a POC (Picture Order Count) different from the current picture.

10. A non-transitory computer-readable medium for storing compressed data associated with a video signal, the compressed data comprising:
  information for a motion vector difference value of a current block,
  wherein the motion vector difference value of the current block is scaled based on a motion vector precision of the current block,
  wherein a motion vector prediction value of the current block is obtained from a motion vector predictor list,
  wherein a motion vector of the current block is obtained using the motion vector prediction value and the scaled motion vector difference value,
  wherein a reference picture of the current block is determined based on a reference picture list,
  wherein a prediction sample of the current block is obtained by using the motion vector and the reference picture,
  wherein when it is determined that the motion vector precision of the current block is determined from a motion vector precision set including a plurality of motion vector precision candidates, the motion vector precision of the current block is determined based on index information specifying one of the plurality of motion vector precision candidates,
  wherein when it is determined that the motion vector precision of the current block is determined without using the motion vector precision set, the motion vector precision of the current block is determined without parsing the index information, and
  wherein determination of whether the motion vector precision set is used or not is based on a flag included in the compressed data.

* * * * *